UNITED STATES PATENT OFFICE.

MAX FISCHER, OF BASEL, SWITZERLAND, ASSIGNOR TO J. R. GEIGY S. A., OF BASEL, SWITZERLAND, A CORPORATION OF SWITZERLAND.

PROCESS OF MAKING 2-AMINOANTHRAQUINONE.

1,338,363.  Specification of Letters Patent.  Patented Apr. 27, 1920.

No Drawing. Original application filed March 8, 1919, Serial No. 281,499. Divided and this application filed October 16, 1919. Serial No. 331,076.

*To all whom it may concern:*

Be it known that I, MAX FISCHER, a citizen of the Swiss Republic, and resident of Basel, Switzerland, have invented a new and useful Process of Making 2-Aminoanthraquinone, of which the following is a full, clear, and exact specification.

This is a divisional application of my application for Letters Patent filed March 8, 1919, Ser. No. 281,499.

It is a well-known fact that when the anthraquinone-2-sulfonic acid is treated with ammonia, the yield of 2-aminoanthraquinone increases up to 73.7% in the presence of chlorid of barium, while the yield is 50% only without chlorid of barium. This favorable effect of the chlorid of barium is explained by the slight solubility of the sulfite of barium which prevents the sulfurous acid, that is produced by the reaction, from further influencing the anthraquinone molecule.

This fact might lead to the assumption that an addition of chlorid of calcium in the place of chlorid of barium would have the same favorable effect as to the yield, in consequence of the formation of calcium sulfite of which the solubility is also rather poor. This, however, is not the case, since the yield is then only 60 per cent. of the theory.

Now, I have made the surprising observation that in the presence of chlorid of calcium the treatment with ammonia leads to a yield of about 79.2 per cent. of the theory if a further quantity of chlorid of magnesium is added to the mixture. Hereby the magnesium chlorid can be replaced partly by chlorid of ammonium.

In order to illustrate the new process more fully the following example is given, the parts being by weight:

100 parts of the sodium salt of anthraquinone-2-sulfonic acid are heated during 7 hours to 205° C. in the autoclave together with 1000 parts of a concentrated aqueous solution of ammonia of about 23%, 60 parts of crystallized chlorid of calcium and 100 parts of magnesium chlorid. After cooling down, the contents of the autoclave are filtered off and the red pap-like crystalline mass is boiled out successively with water, diluted hydrochloric acid and a solution of soda. The dried product is the pure 2-aminoanthraquinone. The yield amounts to 57 parts or 79.2 per cent. of the theory.

Instead of magnesium chlorid a mixture of magnesium chlorid with ammonium chlorid can be employed.

What I claim is:

1. The herein described process for the manufacture of 2-aminoanthraquinone consisting in heating under pressure anthraquinone-2-sulfonic acid with ammonia in the presence of calcium chlorid and of magnesium chlorid.

2. The herein described process for the manufacture of 2-aminoanthraquinone consisting in heating under pressure anthraquinone-2-sulfonic acid with ammonia in the presence of calcium chlorid, magnesium chlorid and ammonium chlorid.

In witness whereof I have hereunto signed my name this 1st day of October, 1919, in the presence of two subscribing witnesses.

MAX FISCHER.

Witnesses:
H. H. DIRK,
OMAND RITTER.